C. & J. F. YORK.
GRAIN-SEPARATOR.

No. 177,781.  Patented May 23, 1876.

Attest
Harry S. Knight
Horace E. Johnson.

Charles York
John F. York
By Knight Bros. Atty

N. PETERS, PHOTO-LITHOGRAPHER, WASHINGTON, D. C.

UNITED STATES PATENT OFFICE.

CHARLES YORK AND JOHN F. YORK, OF ROBINSON, ILLINOIS.

IMPROVEMENT IN GRAIN-SEPARATORS.

Specification forming part of Letters Patent No. 177,781, dated May 23, 1876; application filed March 27, 1876.

*To all whom it may concern:*

Be it known that we, CHARLES YORK and JOHN F. YORK, both of Robinson, Crawford county, Illinois, have invented a new and useful Convertible Grain and Grass-Seed Separator and Cleaner, of which the following is a specification:

Our invention relates to a device which in one form is applicable to the separation and cleaning of grain, and which in another form is applicable to the same operations on smaller seed, such as grass and clover seed.

Figure 1:
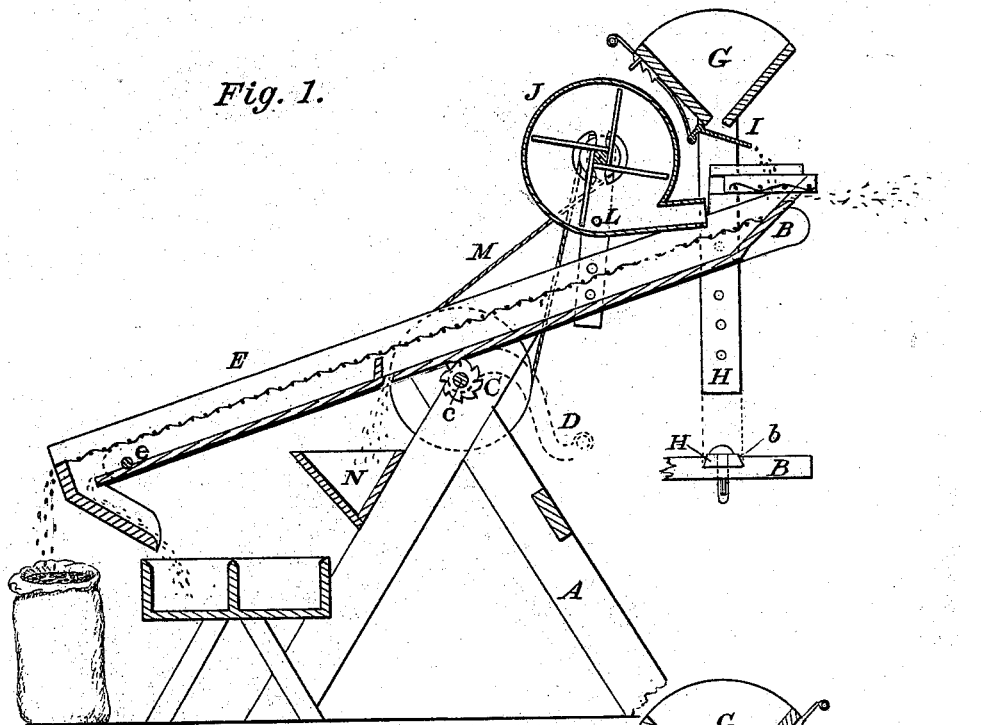
Figure 2:
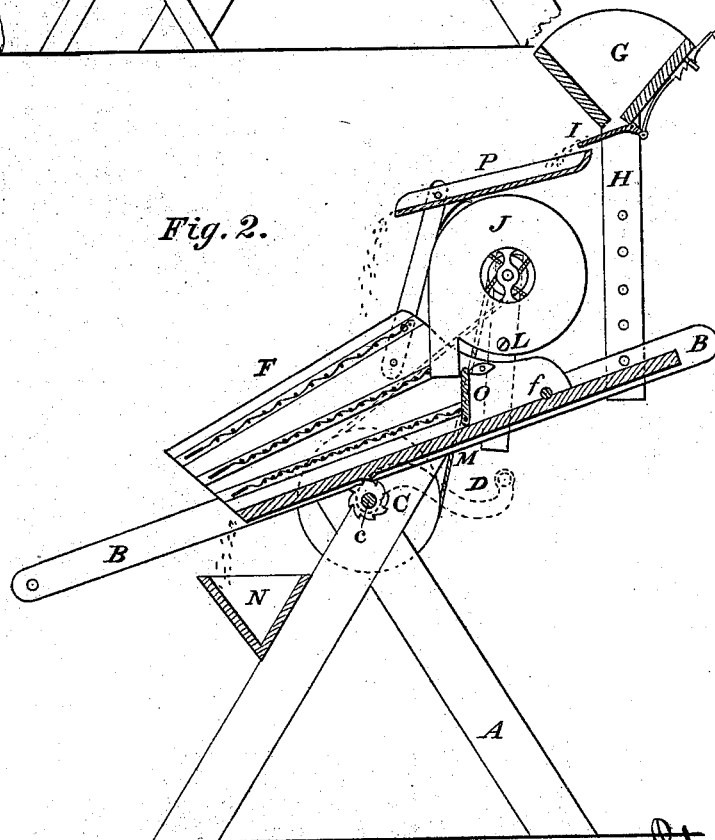

In the accompanying drawings, Figure 1 is a vertical section of our apparatus as adapted to operate on wheat or other grain. Fig. 2 is a similar section, showing the apparatus adapted for operation upon very small seed—that of grass or clover.

A is a stand or trestle, to which is attached a pair of parallel sloping beams, B, of which one only is seen in the figures. C is a cam-wheel, whose shaft $c$ has a winch or handle, D, by which it is rotated, so as to impart the desired shake or jar to the screen or shoe which may either have the form E for operation upon wheat or other grain, or the form F for operation upon grass or smaller seed.

The wheat-screen E is pivoted at $e$, near its discharging ends, to the beams B. The grass-seed screen F is pivoted at $f$ near its receiving end to the said beams B. Either screen when thus pivoted rests at or near its mid length upon the cam-wheel C.

G is a hopper having two stems, of which one, H, is shown and which occupy grooves $b$ in the beams B. The hopper is capable of being fixed at any desired height, as at Fig. 1 or as at Fig. 2, and its sloping sides converge to a long narrow vent at bottom, which is capable of being partially or wholly closed by means of a hinged flap or valve, I, which also operates as a chute to direct the grain or seed into the screen, and for this purpose the hopper is so placed as to direct its delivery rearward for grain, as in Fig. 1, or forward for grass-seed, as in Fig. 2. J is a fan, whose shaft $j$ extends somewhat outside of it, so as to rest in two posts, K, of which one is shown. This fan is capable of being rotated upon its shaft and fixed in any desired position by means of a pin or screw, L, so that it can be directed rearward, as in Fig. 1, or downward, as in Fig. 2. The shaft $j$ is driven by belted connection M with cam-shaft $c$. N is a box to catch the lighter seed refuse. O is a wind-board to regulate the amount of blast. P is a shake-shelf, which conducts seed over the fan into the screen F.

We claim as new, and of our invention—

The combination, with a stand or trestle, A B, having pivots $e$ and $f$ for different forms of screen, of reversible fan L, and reversible and vertically-adjustable hopper G H, the whole being arranged and adapted to operate as set forth.

In testimony of which invention we hereunto set our hands.

CHARLES YORK.
JOHN F. YORK.

Attest:
GEO. H. KNIGHT,
HORACE E. JOHNSON.